United States Patent
Bogner et al.

(10) Patent No.: US 11,661,532 B2
(45) Date of Patent: May 30, 2023

(54) ADHESIVES FOR CHEMICAL MECHANICAL PLANARIZATION APPLICATIONS

(71) Applicant: Avery Dennison Corporation, Glendale, CA (US)

(72) Inventors: Josh M. Bogner, Mentor, OH (US); Dong-Tsai Hseih, Arcadia, CA (US)

(73) Assignee: Avery Dennison Corporation, Mentor, OH (US)

( * ) Notice: Subject to any disclaimer, the term of this patent is extended or adjusted under 35 U.S.C. 154(b) by 63 days.

(21) Appl. No.: 15/579,797

(22) PCT Filed: Jun. 7, 2016

(86) PCT No.: PCT/US2016/036252
§ 371 (c)(1),
(2) Date: Dec. 5, 2017

(87) PCT Pub. No.: WO2016/200833
PCT Pub. Date: Dec. 15, 2016

(65) Prior Publication Data
US 2018/0362810 A1    Dec. 20, 2018

Related U.S. Application Data

(60) Provisional application No. 62/172,441, filed on Jun. 8, 2015.

(51) Int. Cl.
*C09J 7/38* (2018.01)
*B24B 37/22* (2012.01)
(Continued)

(52) U.S. Cl.
CPC ............... *C09J 7/38* (2018.01); *B24B 37/22* (2013.01); *C08K 3/04* (2013.01); *C08K 5/435* (2013.01);
(Continued)

(58) Field of Classification Search
CPC ........................................................ C09J 7/38
See application file for complete search history.

(56) References Cited

U.S. PATENT DOCUMENTS

| | | | |
|---|---|---|---|
| 4,138,228 | A | 2/1979 | Hoehn |
| 4,728,552 | A | 3/1988 | Jensen |

(Continued)

FOREIGN PATENT DOCUMENTS

| | | |
|---|---|---|
| CN | 1606133 | 4/2005 |
| CN | 1693404 | 11/2005 |

(Continued)

OTHER PUBLICATIONS

Nakamura et al., "Effects of Compatibilty of Acrylic Block Copolymer and Tackifier on Phase Structure and Peel Adhesion of Their Blend", Journal of Adhesion Science and Technology 22 (2008) 1313-1331 (Year: 2008).*

(Continued)

*Primary Examiner* — Daniel H Lee

(57) ABSTRACT

Adhesives for use in polishing pads in chemical mechanical planarization (CMP) applications are described. The adhesives include an adhesive component and exhibit particular properties. Also described are transfer tapes containing the adhesives, CMP pads utilizing the adhesives, and related methods of use.

15 Claims, 2 Drawing Sheets

(51) Int. Cl.
  *C08K 3/04* (2006.01)
  *C08K 5/435* (2006.01)
  *C09J 11/04* (2006.01)
  *C09J 133/08* (2006.01)
  *C09J 167/00* (2006.01)
  *C09J 175/02* (2006.01)
  *C09J 183/04* (2006.01)

(52) U.S. Cl.
  CPC ............ *C09J 11/04* (2013.01); *C09J 133/08* (2013.01); *C09J 167/00* (2013.01); *C09J 175/02* (2013.01); *C09J 183/04* (2013.01); *C08K 2201/005* (2013.01); *C09J 2421/00* (2013.01); *C09J 2433/00* (2013.01); *C09J 2467/00* (2013.01); *C09J 2475/00* (2013.01); *C09J 2483/00* (2013.01)

(56) References Cited

U.S. PATENT DOCUMENTS

| | | | |
|---|---|---|---|
| 4,841,680 | A | 6/1989 | Hoffstein et al. |
| 4,927,432 | A | 5/1990 | Budinger et al. |
| 5,020,283 | A | 6/1991 | Tuttle |
| 5,212,910 | A | 5/1993 | Brelvogel et al. |
| 5,329,734 | A | 7/1994 | Motorola |
| 5,533,923 | A | 7/1996 | Shamouilian et al. |
| 7,101,275 | B2 | 9/2006 | Roberts et al. |
| 8,334,037 | B2 | 12/2012 | Sheridan et al. |
| 2004/0126575 | A1 | 7/2004 | Yoshida et al. |
| 2005/0227031 | A1* | 10/2005 | Yang ................ B32B 17/10577 428/40.1 |
| 2008/0054227 | A1 | 3/2008 | McCormick et al. |
| 2012/0034443 | A1* | 2/2012 | Soeda ..................... C09J 7/22 428/220 |
| 2012/0322910 | A1* | 12/2012 | Chatterjee ............ C09J 123/283 522/126 |
| 2014/0037947 | A1 | 2/2014 | Kazuno |
| 2014/0065415 | A1* | 3/2014 | Sasaki .................. C08G 18/482 428/354 |
| 2014/0147989 | A1* | 5/2014 | Luo ........................ C09J 11/04 438/459 |
| 2014/0316041 | A1* | 10/2014 | Mehta ..................... C08L 83/04 524/323 |
| 2015/0030839 | A1* | 1/2015 | Satrijo ..................... C08L 53/00 428/220 |

FOREIGN PATENT DOCUMENTS

| | | |
|---|---|---|
| CN | 101678653 | 2/2013 |
| CN | 103492124 | 1/2014 |
| EP | 1588802 | 10/2005 |

OTHER PUBLICATIONS

International Preliminary Report on Patentability issued in corresponding IA No. PCT/US2016/036252 dated Dec. 12, 2017.

Nakamura Yoshinobu et al: "Effects of compatibility of acrylic block copolymer and tackifier on phase structure and peel adhesion of their blend", Journal of Adhesion Science and Technology, Taylor & Francis, GB, val. 22, No. 12, Jan. 1, 2008 (Jan. 1, 2008), pp. 1313-1331.

International Search Report and Written Opinion issued in IA No. PCT/US2016/036252 dated Nov. 9, 2016.

* cited by examiner

ADHESIVES FOR CHEMICAL MECHANICAL PLANARIZATION APPLICATIONS

CROSS-REFERENCE TO RELATED APPLICATION

The present application is a 371 of International Application No. PCT/US16/36252, which was published in English on Dec. 15, 2016, and claims the benefit of U.S. Provisional Patent Application No. 62/172,441 filed Jun. 8, 2015, both of which is incorporated herein by reference in their entireties.

FIELD

The present subject matter relates to adhesives for use in chemical mechanical planarization (CMP) applications. The present subject matter also relates to transfer tapes and CMP polishing pads containing such adhesives.

BACKGROUND

Chemical mechanical planarization, also referred to as chemical mechanical polishing, for planarizing semiconductor substrates and other components is now widely known to those skilled in the art and has been described in numerous patents and publications. An introductory reference on CMP is "Chemical-Mechanical Polish" by G. B. Shinn et al., Chapter 15, pages 415-460, in Handbook of Semiconductor Manufacturing Technology, editors: Y. Nishi and R. Doering, Marcel Dekker, New York City (2000).

In a typical CMP process, a substrate such as a wafer is placed in contact with a rotating polishing pad attached to a platen. A CMP slurry, typically an abrasive and chemically reactive mixture, is supplied to the pad during CMP processing of the substrate. During the CMP process, the substrate and the pad which may be fixed to the platen, are rotated while a wafer carrier system or polishing head applies pressure such as a downward force against the substrate. The CMP slurry accomplishes the planarization, i.e., polishing, process by chemically and mechanically interacting with the substrate layer being planarized due to the effect of the rotational movement of the pad relative to the substrate. Polishing is continued in this manner until the desired layer on the substrate is removed with the usual objective being to effectively planarize the substrate. Typically, CMP slurries contain an abrasive material, such as silica or alumina, which is suspended in an oxidizing, aqueous medium.

Typical materials used to manufacture polishing pads include felt fiber fabric and polyurethane and polyethylene foams. The pads can be either a single layer or a mutli-layered construction and are often die cut or hole punched. In general, the polishing pad has sufficient rigidity to provide the desired planarity, and sufficient resilience to obtain the desired continuous pressure between the pad and the substrate as the substrate thickness decreases during the polishing process. A multi-layered pad, sometimes referred to as a "stacked pad," is normally a combination of a soft lower pad and a hard top pad. These portions of a stacked pad are adhered together.

Polishing pads are subjected to stress forces in directions both parallel to and transverse to the pad-substrate interfacial surface. In addition, pad deterioration may occur because of the harsh chemical environment. Thus, the adhesion strength of adhesives used with the polishing pad must be adequate to resist the applied multidirectional forces during polishing, and chemical deterioration should not occur.

Adhesives used in stacked pads are typically pressure sensitive adhesives (PSAs). Selection of a PSA to be used between the top pad and sub-pad layers is usually based on semiconductor polishing end use conditions. Selection is based on the chemicals used during the polishing process, the pressure used during the polishing operation, the temperature reached on the surface of the pad due to friction between the pad and the wafer and the chemical nature of the polymers used in the pads. Shear stresses induced by pressure on the wafer and chemicals used during polishing can have a deleterious effect on the PSA performance.

Although satisfactory in certain respects, typical PSAs can undergo failure when used in CMP applications. One type of failure relates to loss of adhesion between intermediate layers of the pad during polishing. This is referred to as delamination. Failures can have various degrees of severity, e.g., delamination along an entire surface of the pad or localized delamination, for example at pad edges. These failures result in productivity losses, potential breakage of wafers and unacceptable production downtime.

Thus, a need exists for adhesives that can be used in CMP applications which are not prone to failure and yet do not detrimentally impact the CMP process.

SUMMARY

The difficulties and drawbacks associated with previous approaches are addressed in the present subject matter as follows.

In one aspect, the present subject matter provides an interlayer adhesive for a CMP stacked pad. The adhesive comprises an adhesive component. The adhesive exhibits (i) a modulus greater than $10^5$ Pa at a temperature within a range of from about 25° C. to about 80° C., and (ii) a modulus less than $10^5$ Pa at a temperature greater than 100° C.

In another aspect, the present subject matter provides a transfer tape comprising at least one of a liner and a carrier, and a layer of an adhesive disposed on at least one of the liner and the carrier. The adhesive includes an adhesive component. The adhesive exhibits (i) a modulus greater than $10^5$ Pa at a temperature within a range of from about 25° C. to about 80° C., and (ii) a modulus less than $10^5$ Pa at a temperature greater than 100° C.

In still another aspect, the present subject matter provides a CMP polishing pad comprising at least one pad layer, and a layer of an adhesive disposed on the pad layer. The adhesive includes an adhesive component. The adhesive exhibits (i) a modulus greater than $10^5$ Pa at a temperature within a range of from about 25° C. to about 80° C., and (ii) a modulus less than $10^5$ Pa at a temperature greater than 100° C.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
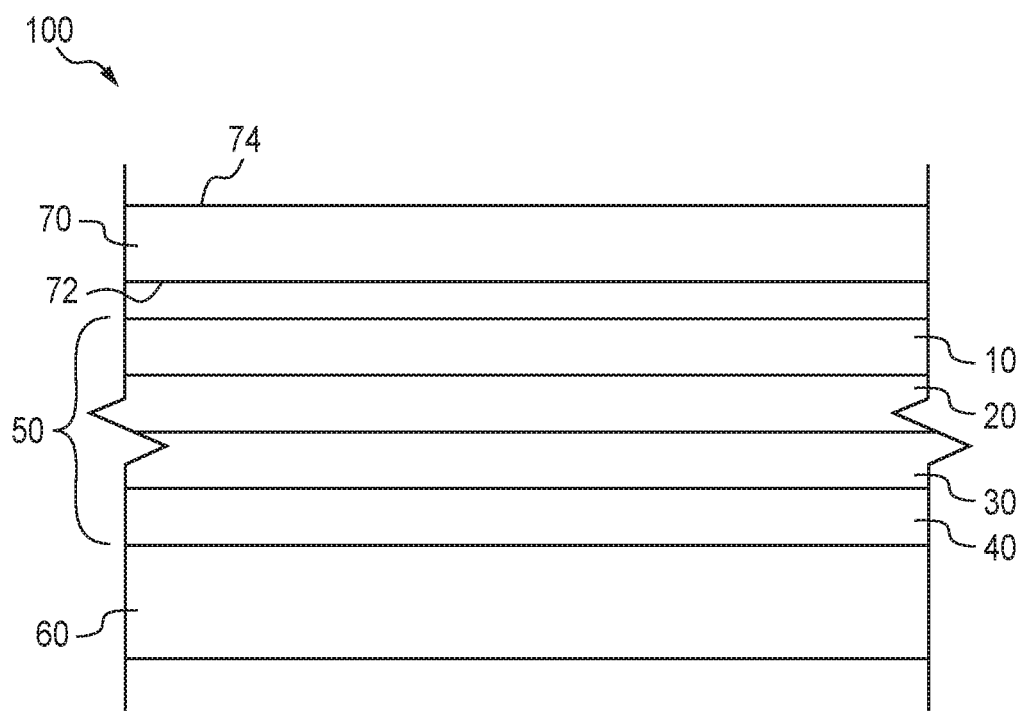
FIG. 1 is a schematic cross sectional illustration of a stacked CMP polishing pad including adhesive in accordance with the present subject matter adhered to a platen and positioned for polishing a wafer or other component of interest.

The present subject matter relates to adhesives for use in CMP applications and particularly for use in CMP polishing pads. The adhesives comprise an adhesive component that has a broadened infrared absorption spectrum by addition of high IR absorption components, which facilitate improved heat transfer when exposed to infrared radiation (herein referred to as an "IR adhesive"). In certain embodiments, the adhesives also comprise carbon black. The adhesives may optionally comprise one or more additional components including but not limited to tackifiers, plasticizers, fillers, additives, and combinations thereof. Additional details of these and other aspects of the adhesives are provided herein.

The present subject matter also relates to transfer tapes that include a layer or region of the noted adhesive(s). In certain embodiments the transfer tapes include a liner. And in other embodiments, the transfer tapes may include a carrier.

The present subject matter also relates to CMP polishing pad(s) that include a layer or region of the noted adhesives.

The present subject matter additionally relates to methods of attaching a layer or region of a CMP polishing pad to another layer or region of the CMP polishing pad using the noted adhesives.

These aspects and others are all described in greater detail as follows.
Adhesives
IR Adhesive As noted, the adhesives of the present subject matter comprise one or more adhesive components and in certain embodiments also comprise a thermally sensitive material, such as carbon black, dispersed therein. The present subject matter adhesives exhibit (i) a modulus greater than the Dahlquist criterion, i.e., $10^5$ Pa, at a temperature within a range of from about 25° C. to about 80° C., and (ii) a modulus less than the Dahlquist criterion at a temperature greater than 100° C. Details concerning the Dahlquist criterion are known in the adhesive arts and are described in the Handbook of Pressure Sensitive Adhesive Technology, Donatas Satas (Ed.), 2nd Edition, pp. 172-173, Van Nostrand Reinhold, New York, N.Y. (1989). These moduli are storage moduli and are measured via dynamic mechanical analysis (DMA) as known in the art.

In particular embodiments, the adhesive may exhibit induced crystallinity after heating which allows for crystals to form upon cooling which greatly increases the modulus between an operating range of about 20° C. to about 80° C.

A wide array of adhesive components can be used in the present subject matter adhesives. Non-limiting examples of potentially suitable adhesive components include urethane adhesives, acrylic adhesives, rubber adhesives, polyester adhesives and silicone adhesives. However, it will be appreciated that the present subject matter includes the use of other types of adhesives for the adhesive component. It will also be understood that the adhesive component may also include one or more activating agents. These agents can be in the form of curing agents, crosslinking agents, and other additives. It is also contemplated that a wide array of viscosity adjusting agents such as one or more solvents can be included in the adhesive component.

In many embodiments, the adhesives also comprise carbon black. Nearly any carbon black in particulate or flake form can be used in the present subject matter adhesives. In many embodiments, the carbon black has a particle size within a range of from about 1 micron to about 20 microns. However, the present subject matter includes the use of carbon black having particle sizes greater than 20 microns and/or less than 1 micron.

The carbon black is incorporated in the adhesive by uniform dispersal therein. In many embodiments, the carbon black is used in a weight proportion of from about 0.1% to about 20%, based upon the total weight of the adhesive. In particular embodiments, the carbon black is used at a weight proportion of from about 0.5% to about 10%. It will be understood that the present subject matter includes the use of different proportions of carbon black in the adhesive, i.e., less than about 0.1% and greater than about 20%.

A wide array of commercially available sources of carbon black may be used as infrared absorbing materials. For example, carbon black dispersion available from Kalcor Coatings Company under the designation 981-66 can be used. In many applications, carbon black from Cabot Corporation of Boston, Mass. is utilized. Another suitable carbon black is available under the designation AURASPERSE W-7012, available from BASF Corporation of Florham Park, N.J. Besides Carbon black, other IR absorption material can be incorporated in the adhesive formulation, such as doped metal oxide particles including, by way of example, Zelec ECP powders from Milliken Chemicals which are metal oxides coated with antimony tin oxide. Other types of IR absorbing materials can include, but are not limited to, graphitic additives such as carbon nanotubes, carbon nanofibers, graphite flakes and the like. Other types of IR absorbing materials include near infrared dyes which show light absorption in the near infrared area of about 700 nm to about 2000 nm. The near infrared dyes intense absorption normally originates from a charge transfer of an organic dye or metal complex. Materials of near infrared absorption involve cyanine dyes having an extended polymethine, phthalocyanine dyes with a metal center of aluminum or zinc, naphthalocyanine dyes, nickel dithiolene complexes with a square-planar geometry, squarylium dyes, quinine analogs, diimonium compounds and azo derivatives.

The adhesive may optionally comprise one or more other agents or components such as, but not limited to, tackifiers, plasticizers, fillers, additives, and other agents, and combinations thereof.

A variety of plasticizers can be incorporated in the adhesives of the present subject matter, so long as they are compatible with the adhesive component(s) and the end use application requirements of the resulting adhesive. An example of a suitable plasticizer for use in the adhesives is UNIPLEX 214 plasticizer which is commercially available from Unitex Chemical Corp. UNIPLEX 214 is N-butylbenzene sulfonamide (BBSA), which is a liquid sulfonamide plasticizer. This plasticizer enhances high temperature flexibility. A wide array of other plasticizers, including, but not limited to, other sulfonamide plasticizers such as Uniplex 108 (N-ethyl toluenesulfonamide, are contemplated for use in the adhesives.

The plasticizer is used in a weight proportion of from about 0.1% to about 20%, based upon the total weight of the adhesive. In particular embodiments, the plasticizer is used at a weight proportion of from about 0.5% to about 10%. It will be understood that the present subject matter includes the use of different proportions of plasticizer in the adhesive.

A variety of tackifiers can be incorporated in the adhesives of the present subject matter, so long as they are compatible with the adhesive component(s) and the end use application requirements of the resulting adhesive. An example of a suitable tackifier for use in the adhesives is DERTOPHENE T, which is a light colored terpene phenolic resin commercially available from DRT of France. A wide array of terpene phenolic tackifiers can be used. The tackifiers generally enhance adhesion, hot tack, and/or flexibility of the resulting adhesive. Other categories tackifier may be incorporated in the adhesive as well, such rosin esters (Foral 85E) from Eastman Chemicals, polyterpenes (Piccolyte 115A) from Pinova, Inc., styrenated polyterpenes (Zonatac NG 98 from Arizona Chemicals, C5 resins (Escorez 1310LC) from Exxon Mobile Chemical, C9 resins (Norsolene A-90) from Cray Valley Hydrocarbon Specialty Chemicals The tackifier is used in a weight proportion of from about 0.1% to about 20%, based upon the total weight of the adhesive. In particular embodiments, the tackifier is used at a weight proportion of from about 0.5% to about 10%. It will be understood that the present subject matter includes the use of different proportions of tackifiers in the adhesive.

Transfer Tapes

The present subject matter also provides various transfer tapes that include the noted adhesives. The transfer tapes comprise one or more layer(s) and/or region(s) of the noted adhesives and a liner such as a release liner. In certain embodiments the transfer tapes can optionally include a carrier such as a thin carrier film.

Typically, the adhesive when incorporated in a transfer tape is in the form of a single uniform and continuous layer having a thickness of from about 0.5 mil to about 20 mil, and more particularly from about 1.0 mil to about 10 mil. The present subject matter also includes the use of patterned adhesives and multiple layers of the adhesives in the transfer tapes.

The transfer tapes comprise one or more liners covering a face and/or region of the adhesive. The liners can be paper, film, and/or composites of paper and film. A wide array of materials typically used for release liners in the labeling arts can be used so long as the liner material selected satisfies the requirements associate with the CMP application of interest.

In certain embodiments, the transfer tapes also comprise a carrier which can be in the form of a paper, a film, and/or composite material. Again, a wide array of materials can potentially be used for the carrier. It is also contemplated that the present subject matter can include a transfer tape with a carrier and free of a liner.

CMP Polishing Pads

CMP polishing pads are well described in the art. Generally, CMP polishing pads include one or more layers or regions of a matrix material that includes a plurality of conduits or passages extending partially or entirely through the layer or region. Typically, the conduits are provided by one or more materials different than the matrix material. The conduits or passages permit flow or transfer of polishing slurry, reactive etchant materials (if used), heat transfer medium, and/or lubricant(s). CMP polishing pads, materials for forming such, methods of their construction and use are described in U.S. Pat. Nos. 4,138,228; 4,728,552; 4,841,680; 4,927,432; 5,020,283; 5,212,910; 5,329,734; and 5,533,923.

Methods

The adhesives of the present subject matter are prepared by conventional mixing and blending techniques. In many applications, the adhesives are prepared by known shear mixing methods. The adhesives can then be applied as desired such as to a region or face of a CMP pad or layer thereof. Alternatively, the adhesives can be incorporated in a tape form to thereby produce the transfer tapes of the present subject matter. The adhesive can be deposited in a layer form in the tape by conventional heat lamination techniques such as at a temperature of from about 80° C. to about 200° C.

If the adhesive is provided in a tape form, the adhesive is used as follows. Prior to adhesive placement on a CMP pad or sublayer, an exposed face of the adhesive layer is irradiated with infrared radiation to activate or at least partially activate the adhesion. Once sufficiently irradiated, the adhesive face is then contacted with and adhered to the CMP pad or layer thereof.

In particular embodiments, the adhesives are irradiated with infrared radiation having a wavelength of from about 700 nm to about 2000 nm (2 mm) for a time period of from about 0.1 seconds to about 10 seconds. In particular embodiments, the adhesives typically in a layer form, are exposed to such infrared radiation for a time period of from 0.5 seconds to about 5 seconds. It will be understood that the present subject matter also includes exposure times less than 0.1 seconds and greater than 10 seconds. Or longer duration in order adhesive to reach needed viscosity. Sufficient time and temperature is applied so that a modulus transition will occur.

Although not wishing to be bound to any particular theory, it is believed that incorporation of the IR absorption materials, such as carbon black, in the adhesives promotes infrared absorption and accompanying temperature increase of the adhesive. Thus, the adhesives of the present subject matter may be used in bonding pad layers which contain relatively thermally sensitive materials, which would otherwise preclude or hinder attempts to heat the pad layer during or after application of adhesive thereto.

After incorporation in a CMP pad such as for example by bonding two layers together in a stacked pad, the adhesive forms a permanent bond.

The adhesives of the present subject matter exhibit excellent resistance to a wide range of pH values such as from a pH of 2 to 12, for a time period of up to 24 hours. CMP polishing slurries often exhibit acidic or basic pH values and may also include reactive agents. The adhesives of the present subject matter exhibit excellent resistance to such polishing slurries. In certain embodiments, the adhesives can withstand exposure to the noted pH values for a time period greater than 24 hours without adhesive degradation and/or delamination. In particular embodiments, the adhesives of the present subject matter also exhibit excellent heat resistance such as up to 80° C. for a time period of up to 24 hours or longer, without adhesive degradation and/or delamination.

Representative Embodiments

FIG. 1 is a schematic cross sectional illustration of a CMP system 100 including a stacked CMP pad 50 adhered to a platen 60 and positioned for polishing a wafer 70 or other component. The pad 50 comprises an outer or topmost layer 10, an adhesive layer 20, one or more intermediate or sublayer(s) 30, and a platen adhesive layer 40. The adhesives of the present subject matter are used within the pad 50, such as represented by layer 20 for example. Typically, the present subject matter adhesives are permanent adhesives and so not used in the platen adhesive layer 40 as those adhesives should be removable and allow easy separation of the pad from the platen. It will be understood that the adhesives of the present subject matter can be used at different regions within a CMP pad, and particularly a stacked pad, in addition to, or instead of, the respective arrangement shown in FIG. 1. Moreover, it will be understood that the adhesives can be used at multiple locations and in multiple layers within a pad.

FIG. 1 schematically depicts the wafer 70 as defining a first face 72 and a second oppositely directed face 74. The face 72 is directed toward the top or outer layer 10 of the pad 50. Although a space or distance between the face 72 and the layer 10 is shown in FIG. 1, it will be understood that during a CMP operation, i.e., planarization of the face 72, that face contacts the layer 10 of the pad 50.

Figure 2:
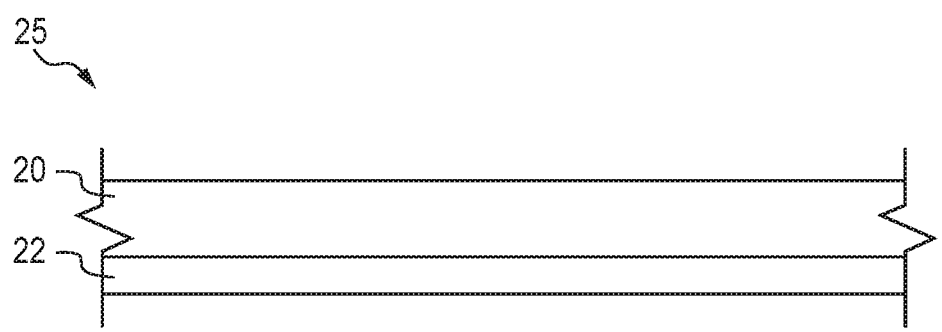
FIG. 2 is a schematic cross sectional illustration of an embodiment of a transfer tape including adhesive in accordance with the present subject matter.

FIG. 2 is a schematic cross sectional illustration of a transfer tape 25 in accordance with the present subject matter. The tape 25 comprises a layer of the adhesive 20 of the present subject matter disposed on a liner 22.

Figure 3:
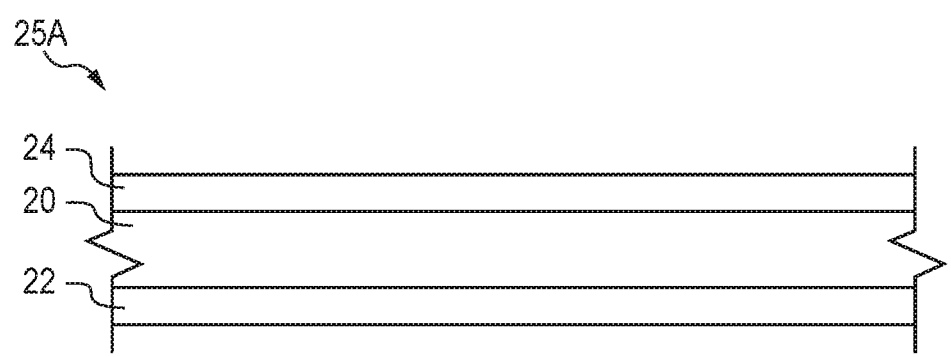
FIG. 3 is a schematic cross sectional illustration of another embodiment of a transfer tape including adhesive in accordance with the present subject matter.

FIG. 3 is a schematic cross sectional illustration of another transfer tape 25A in accordance with the present subject matter. The tape 25A comprises a layer of the adhesive 20 of the present subject matter disposed between a liner 22 and a carrier 24.

Examples

Various adhesives in accordance with the present subject matter were prepared as shown in Table 1.

TABLE 1

Representative Adhesives in Accordance with Present Subject Matter

| Sample | Urethane Adhesive Component (%) | Uniplex 214 Plasticizer (%) | Dertophene T Tackifier (%) | 981-66 Carbon Black (%) | Peel Test Results |
|---|---|---|---|---|---|
| 1 | 82 | 9.8 | 8.2 | 0 | Pass |
| 2 | 74 | 12 | 14 | 0 | Pass |
| 3 | 85 | 12 | 0 | 3 | Pass |
| 4 | 72 | 11 | 14 | 3 | Pass |
| 5 | 86 | 13 | 0 | 1 | Failed |

TABLE 2

Storage modulus of tested samples by DHR-2 Rheometer

| Sample ID | 25° C. Pascal | 60° C. Pascal | 80° C. Pascal | 100° C. Pascal | Peel Test Results |
|---|---|---|---|---|---|
| 1 | 1.51E+06 | 4.32E+05 | 2.09E+05 | 9.13E+04 | Pass |
| 2 | 1.78E+06 | 4.75E+05 | 1.90E+05 | 7.05E+04 | Pass |
| 3 | Not tested | Not tested | Not tested | Not tested | Pass |
| 4 | Not tested | Not tested | Not tested | Not tested | Pass |
| 5 | Not tested | Not tested | Not tested | Not tested | Pass |
| 6 | 2.36E+05 | 1.02E+05 | 5.98E+04 | 3.67E+04 | Failed |

The procedure was as follows: Adhesive tape and reference CMP sub pad was placed in 240° F. convection oven for 1 minute. After a 1 minute period, the samples were removed from the oven and were laminated at 30% compression. The laminate was then placed back in a 240° F. convection oven for 1 minute with reference top pad and was laminated at 30% compression after removal.

The samples were allowed to rest for 24 hours. After a 24 hour rest period, a T-peel adhesion test was performed at 12"/min cross head speed. 3 replicates were measured and all 3 replicates showed sub pad foam tear. 3 different sub pad types were tested at various commercially available densities and all 3 types showed foam tear upon T-peel.

Samples 3-5 exhibited excellent adhesive strength and resistance to harsh chemical environments when incorporated in a CMP pad and used in a CMP process.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An interlayer adhesive for a CMP stacked pad, the adhesive consisting essentially of:
   from about 72% to about 86% by weight of an adhesive component,
      wherein the adhesive component is exposed to infrared radiation,
      wherein the adhesive component consists of a urethane adhesive and optionally an adhesive selected from the group consisting of acrylic adhesives, rubber adhesives, polyester adhesives, silicone adhesives, and combinations thereof;
   from about 0.1% to about 20% by weight of an infrared absorbing additive;
   from about 0.1% to about 20% by weight of a plasticizer;
   from about 0.1% to about 20% by weight of a tackifier; and
   optionally, at least one agent selected from the group consisting of fillers, additives, and combinations thereof;
   wherein the adhesive exhibits (i) a modulus greater than $10^5$ Pa at a temperature within a range of from about 25° C. to about 80° C., and (ii) a modulus less than $10^5$ Pa at a temperature greater than 100° C.; and
   wherein the adhesive is an IR adhesive.

2. The adhesive of claim 1 wherein the infrared absorbing additive has a particle size within a range of from about 1 micron to about 20 microns.

3. The adhesive of claim 1 wherein the infrared absorbing additive is carbon black or a combination of carbon black with another infrared absorbing additive.

4. The adhesive of claim 1 wherein the infrared absorbing additive constitutes from about 1% to about 10% of the total weight of the adhesive.

5. The adhesive of claim 1 wherein the plasticizer is a sulfonamide plasticizer.

6. The adhesive of claim 5 wherein the sulfonamide plasticizer is N-butylbenzene sulfonamide.

7. The adhesive of claim 1 wherein the tackifier is a terpene phenolic tackifier.

8. A transfer tape comprising:
   at least one of a liner and a carrier;

a layer of an adhesive disposed on at least one of the liner and the carrier;
wherein the adhesive consists essentially of:
from about 72% to about 86% by weight of an adhesive component,
  wherein the adhesive component is exposed to infrared radiation,
  wherein the adhesive component consists of a urethane adhesive and optionally an adhesive selected from the group consisting of acrylic adhesives, rubber adhesives, polyester adhesives, silicone adhesives, and combinations thereof;
from about 0.1% to about 20% by weight of an infrared absorbing additive;
from about 0.1% to about 20% by weight of a plasticizer;
from about 0.1% to about 20% by weight of a tackifier; and
optionally, at least one agent selected from the group consisting of fillers, additives, and combinations thereof;
wherein the adhesive exhibits (i) a modulus greater than $10^5$ Pa at a temperature within a range of from about 25° C. to about 80° C., and (ii) a modulus less than $10^5$ Pa at a temperature greater than 100° C.; and
wherein the adhesive is an IR adhesive.

9. The transfer tape of claim 8 wherein the infrared absorbing additive has a particle size within a range of from about 1 micron to about 20 microns.

10. The transfer tape of claim 8 wherein the infrared absorbing additive is carbon black or a combination of carbon black with another infrared absorbing additive.

11. The transfer tape of claim 8 wherein the infrared absorbing additive constitutes from about 1% to about 10% of the total weight of the adhesive.

12. The transfer tape of claim 8 wherein the plasticizer is a sulfonamide plasticizer.

13. The transfer tape of claim 12 wherein the sulfonamide plasticizer is N-butylbenzene sulfonamide.

14. The transfer tape of claim 8 wherein the tackifier is a terpene phenolic tackifier.

15. A CMP polishing pad comprising the interlayer adhesive of claim 1.

* * * * *